United States Patent [19]
Chang et al.

[11] Patent Number: 6,152,965
[45] Date of Patent: Nov. 28, 2000

[54] LOW-VOLTAGE PHOSPHOR MATERIAL HAVING A HIGH DEGREE OF BRIGHTNESS AND A MANUFACTURING METHOD THEREOF

[75] Inventors: Cheol Hyeon Chang; Hyung Keun Park, both of Yangsan-si; Chul Woo Jung, Pusam, all of Rep. of Korea

[73] Assignee: Samsung Display Devices Co., Ltd., Suwon-si, Rep. of Korea

[21] Appl. No.: 09/210,336

[22] Filed: Dec. 11, 1998

[30] Foreign Application Priority Data

Dec. 13, 1997 [KR] Rep. of Korea ............. 97-68428

[51] Int. Cl.⁷ .................. C09K 11/54; C09K 11/56
[52] U.S. Cl. ................................. 752/301.65
[58] Field of Search ......................... 252/301.65

[56] References Cited

U.S. PATENT DOCUMENTS 5,185,207  2/1993  Furuoka et al. ............... 252/301.6 S Primary Examiner—C. Melissa Koslow
Attorney, Agent, or Firm—Christie, Parker & Hale, LLP

[57] ABSTRACT

Disclosed is low-voltage phosphor material having a high level of brightness and a manufacturing method thereof. The phosphor material includes (ZnCd)S or ZnS based compound phosphor material, and a metal added to the phosphor material, the metal having properties for preventing oxidation and reducing surface charge of the phosphor material. The method of manufacturing the phosphor material includes the steps of adding (ZnCd)S based compound phosphor material or ZnS based compound phosphor material to a vehicle and mixing the resulting mixture, and adding a metal to the mixture, the metal having properties for preventing oxidation and reducing surface charge of the phosphor material. Preferably, the metal is Zn having a diameter of 0.1 to 10 $\mu$m and a purity of 95%. Also preferably, the metal is 0.01 to 10.0 wt % based on the wt % of the phosphor material.

6 Claims, No Drawings

LOW-VOLTAGE PHOSPHOR MATERIAL HAVING A HIGH DEGREE OF BRIGHTNESS AND A MANUFACTURING METHOD THEREOF

BACKGROUND OF THE INVENTION (a) Field of the Invention

The present invention relates to low-voltage phosphor material having a high level of brightness and a manufacturing method thereof. More particularly, the present invention relates to a low-voltage phosphor material and a manufacturing thereof in which a metal is added to the phosphor material to prevent oxidation of the phosphor material and reduce surface charge of the same such that brightness of the phosphor material increases.

(b) Description of the Related Art

Low-voltage display devices utilizing voltage of 1 kV or less to radiate phosphor material include the FED (field emission display), the VFD (vacuum fluorescent display) and others. FEDs utilize the well-established cathode-anode-phosphor technology built into full-sized CRTs, and use this in combination with the dot matrix cellular construction of LCDs. However, instead of using the single bulky tube of the CRT, FEDs use tiny 'mini tubes' for each pixel such that the display can be built in approximately the same size as an LCD screen. The VFD is a self-radiating display in which electrons continuously emitted from a filament, which functions as the electron gun in a CRT, are controlled by a grid electrode and an anode electrode to collide with phosphor material on the anode such that the phosphor material is radiated. The VFD offers wide viewing angles and is able to be driven using only a low level of voltage. Accordingly, the display can be used for many applications.

With regard to VFDs, the phosphor material used in the same includes a green ZnO:Zn based compound, and (ZnCd)S and ZnS based compounds of other colors. The green ZnO:Zn phosphor material has a high level of brightness compared to the phosphor material of other colors since it is highly efficient in the radiation of light. That is, the brightness of the phosphor material of other colors for the (ZnCd)S based compound and the ZnS based compound is only 5 to 20% that of the brightness of the green ZnO:Zn phosphor material. Accordingly, the phosphor material of other colors has a far lower level of brightness when compared to the phosphor material of the ZnO:Zn based compound. As a result, the majority of the phosphor material used in VFDs is the green phosphor material, while the phosphor material of other colors is used only minimally. With better image quality being dependent partly upon a high level of brightness, much institutions are conducted to improve the brightness of the phosphor material used in displays.

There is a need to improve the brightness of low-voltage display devices that use phosphor material.

SUMMARY OF THE INVENTION

The present invention has been made in an effort to fulfill the above need.

It is an object of the present invention to provide a low-voltage phosphor material having a high level of brightness and a manufacturing method of a phosphor paste in which a metal is added to the phosphor material to prevent oxidation of the phosphor material and reduce surface charge of the same such that brightness of the phosphor material increases.

To achieve the above object, the present invention provides a low-voltage phosphor material having a high level of brightness and a manufacturing method of a phosphor paste.

The phosphor material includes (ZnCd)S or ZnS based phosphor material, and a metal added to the phosphor material, the metal having properties for preventing oxidation of the phosphor material and reducing surface charge of the phosphor material.

The manufacturing method includes the steps of adding (ZnCd)S based phosphor material or ZnS based compound phosphor material to a vehicle and mixing the resulting mixture, and adding a metal to the mixture, the metal having properties for preventing oxidation of the phosphor material and reducing surface charge of the phosphor material.

DETAILED DESCRIPTION OF THE INVENTION

The present invention provides a low-voltage phosphor material having high brightness. The phosphor material includes (ZnCd)S or ZnS based phosphor material, and a metal added to the phosphor material, the metal having properties for preventing oxidation of the phosphor material and reducing surface charge of the phosphor material.

According to a feature of the present invention, the metal is preferably Zn. According to another feature of the present invention, the metal is Zn having a diameter of 0.1 to 10 $\mu$m and a purity of 95%.

Furthermore, a method of preparing a low-voltage phosphor material is as follows:

Ethyl cellulose, buthyl carbitol acetate and terpineol are mixed to prepare a vehicle as a binder for producing a phosphor paste. (ZnCd)S or ZnS based phosphor powder of 25 to 90 wt %, preferably, 30–90 wt % is added to the vehicle of 5 to 70 wt %, preferably 10–70 wt % and mixed. The exemplary of the (ZnCd)S based phosphor material is a mixture of $(Zn_{0.9}Cd_{0.1})S$:Ag,Cl and $In_2O_3$, a mixture of $(Zn_{0.5}Cd_{0.5})S$:Ag,Cl and $In_2O_3$, a mixture of $(Zn_{0.8}Cd_{0.2})$ S:Ag,Cl, a mixture of $(Zn_{0.4}Cd_{0.6})S$:Ag,Cl and $In_2O_3$, a mixture of $(Zn_{0.3}Cd_{0.7})S$:Ag,Cl and $In_2O_3$, or a mixture of $(Zn_{0.22}Cd_{0.78})S$:Ag,Cl and $In_2O_3$. The exemplary of the ZnS based phosphor material is a mixture of ZnS:Zn and $In_2O_3$ or a mixture of ZnS:Cu,Al and $In_2O_3$.

A metal of 0.01 to 10.0 wt % of the phosphor paste is added to the mixture and shaken, thereby producing low-voltage phosphor paste. The metal has properties for preventing oxidation of the phosphor material and reducing surface charge thereof is added to the mixture and shaken, thereby producing low-voltage phosphor paste having a high degree of brigntness. The metal may be mixed to the phosphor material by adding metal powder to the vehicle or by wet-distributing metal powder to the phosphor.

In the method of the present invention, the metal is preferably Zn. According to another feature of the present invention, the metal is Zn having a diameter of 0.1 to 10 $\mu$m and a purity of 95%.

The phosphor paste is coated on the cathode of VFD and sintered to remove the vehicle and coat the phosphor on the cathode.

Preferred examples of the present invention will now be described in detail.

EXAMPLE 1

Ethyl cellulose, butyl carbitol acetate, and terpineol were mixed to produce a vehicle as a binder. Next, 40 wt % of the vehicle and 59 wt % of a phosphor material powder, having a composition of $(Zn_{0.22}Cd_{0.78})S:Ag,Cl$ and $In_2O_3$, were mixed. While being stirred, 1.0 wt % of a Zn metal of 95% purity having a diameter of 0.5 μm was added to the mixture, thereby producing low-voltage phosphor paste.

COMPARATIVE EXAMPLE 1

Ethyl cellulose, butyl carbitol acetate, and terpineol were mixed to produce a vehicle as a binder. Next, 40 wt % of the vehicle and 60 wt % of a phosphor material powder, having a composition of $(Zn_{0.22}Cd_{0.78})S:Ag,Cl$ and $In_2O_3$, were mixed and shaken to produce low-voltage phosphor paste.

A brightness and a radiation efficiency of a 20–40V VFD, manufactured using the phosphor material of Example 1 and Comparative Example 1, were measured. The results of the measurements are as shown in Table 1 below.

Table 1

|  | Brightness [cd/m$^2$] | Radiation Efficiency [Lm/W] |
| --- | --- | --- |
| Example 1 | 50 | 2.8 |
| Comparative Example 1 | 23 | 1.6 |

Example 2

Ethyl cellulose, butyl carbitol acetate, and terpineol were mixed to produce a vehicle as the binder. Next, 40 wt % of the vehicle and 59 wt % of a phosphor material powder, having a composition of $(Zn_{0.3}Cd_{0.7})S:Ag,Cl$ and $In_2O_3$, were mixed. Subsequently, while being stirred, 1.0 wt % of Zn metal of 95% purity having a diameter of 0.5 μm was added to the mixture, thereby producing low-voltage phosphor paste.

COMPARATIVE EXAMPLE 2

Ethyl cellulose, butyl carbitol acetate, and terpineol were mixed to produce a vehicle as a binder. Next, 40 wt % of the vehicle and 60 wt % of a phosphor material powder, having a composition of $(Zn_{0.3}Cd_{0.7})S:Au,Al$ and $In_2O_3$, were mixed to produce low-voltage phosphor paste.

A brightness and a radiation efficiency of a 12–15V VFD, manufactured using the phosphor material of Example 1 and Comparative Example 1, were measured. The results of the measurements are as shown in Table 1 below.

Table 2

|  | Brightness [cd/m$^2$] | Radiation Efficiency [Lm/W] |
| --- | --- | --- |
| Example 2 | 48 | 4.8 |
| Comparative Example 2 | 15 | 1.9 |

As shown in tables 1 and 2, the brightness and radiation efficiency of the low-voltage phosphor material of the present invention is two to four times greater than that of the prior art. Further, the point at which the inventive phosphor material begins to illuminate is approximately 2V lower than that of the conventional phosphor material.

Other examples of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A low-voltage phosphor material having high brightness comprising:
    a(ZnCd)S-based or ZnS-based phosphor material; and
    Zn added to the phosphor material, the Zn having properties for preventing oxidation and reducing the surface charge of the phosphor material.

2. The phosphor material of claim 1 wherein the Zn has a diameter of 0.1 to 10 μm and a purity of 95%.

3. A method for manufacturing a low-voltage phosphor paste having a high level of brightness comprising the steps of:
    adding a (ZnCd)S-based phosphor material or a ZnS-based phosphor material to a vehicle to form a mixture and mixing the resulting mixture; and
    adding Zn to the mixture to form the phosphor paste, the Zn having properties for preventing oxidation and reducing the surface charge of the phosphor material.

4. The method of claim 3 wherein the Zn has a diameter of 0.1 to 10 μm and a purity of 95%.

5. The method of claim 3 wherein the Zn is present in the phosphor paste in an amount of 0.01 to 10.0 wt % based on the total weight of the phosphor paste of the phosphor paste.

6. The method of claim 3 wherein the vehicle is a mixture of ethyl cellulose, butyl carbitol acetate and terpineol.

* * * * *

UNITED STATES PATENT AND TRADEMARK OFFICE
CERTIFICATE OF CORRECTION

PATENT NO.    : 6,152,965                                              Page 1 of 1
DATED         : November 28, 2000
INVENTOR(S)   : Cheol Hyeon Chang, Hyung Keun Park and Chul Woo Jung It is certified that error appears in the above-identified patent and that said Letters Patent is hereby corrected as shown below:

Column 4,
Line 44, after "of the phosphor paste" delete "of the phosphor paste" (second occurrence).

Signed and Sealed this

Twenty-first Day of May, 2002

Attest:

Attesting Officer

JAMES E. ROGAN
*Director of the United States Patent and Trademark Office*